(12) United States Patent
Wang et al.

(10) Patent No.: US 11,699,942 B2
(45) Date of Patent: Jul. 11, 2023

(54) HYBRID ADDITIVE MANUFACTURING ASSISTED PROTOTYPING FOR MAKING ELECTRO-MECHANICAL COMPONENTS

(71) Applicant: GM Global Technology Operations LLC, Detroit, MI (US)

(72) Inventors: Hongliang Wang, Sterling Heights, MI (US); James G. Schroth, Troy, MI (US); Matthew T. Vanderlip, Windsor (CA); Edwin H. Chang, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 841 days.

(21) Appl. No.: 16/420,643

(22) Filed: May 23, 2019

(65) Prior Publication Data

US 2020/0368969 A1    Nov. 26, 2020

(51) Int. Cl.
*H02K 15/00* (2006.01)
*B33Y 10/00* (2015.01)
(Continued)

(52) U.S. Cl.
CPC .......... *H02K 15/0062* (2013.01); *B22F 7/08* (2013.01); *B22F 10/28* (2021.01); *B29C 64/112* (2017.08);
(Continued)

(58) Field of Classification Search
CPC .............. H02K 15/02; H02K 15/0056; H02K 15/0068; H02K 3/50; H02K 2203/09;
(Continued)

(56) References Cited

U.S. PATENT DOCUMENTS

| 2013/0170171 A1 | 7/2013 | Wicker et al. |
| 2013/0193799 A1* | 8/2013 | Marschall ............... H02K 1/18 |
| | | 310/208 |

(Continued)

FOREIGN PATENT DOCUMENTS

| JP | 2005206893 A | * | 8/2005 |
| WO | 2016149181 A1 | | 9/2016 |

OTHER PUBLICATIONS

X. Deng, S. Lambert, B. Mecrow, M. A. S. Mohamed and S. Ullah, "Winding connection solution for an integrated synchronous motor drive," 2017 IEEE International Electric Machines and Drives Conference (IEMDC), 2017, pp. 1-7, doi: 10.1109/IEMDC.2017.8002162. (Year: 2017).*

(Continued)

*Primary Examiner* — A. Dexter Tugbang
(74) *Attorney, Agent, or Firm* — Quinn IP Law

(57) ABSTRACT

A method for manufacturing an electro-mechanical device includes creating a plurality of substrates using a first additive manufacturing process. Each of the substrates includes a polymeric material. The substrates include a first substrate and a second substrate. The first substrate includes a first main body and defines a protrusion extending from the first main body. The second substrate includes a second main body and a recess defined in the second main body. The method includes coupling the first substrate to the second substrate by inserting the protrusion into the recess such that the protrusion elastically deforms to an elastically averaged configuration. The protrusion and the recess together form an elastic averaging coupling. The method includes creating a plurality of electrically conductive components using a second additive manufacturing process and then coupling the electrically conductive components to at least one of the substrates.

10 Claims, 2 Drawing Sheets

(51) Int. Cl.
*B29C 64/112* (2017.01)
*H02K 15/02* (2006.01)
*B22F 7/08* (2006.01)
*B22F 10/28* (2021.01)
*B33Y 80/00* (2015.01)
*B33Y 40/00* (2020.01)
*H02K 1/18* (2006.01)
*H01R 43/16* (2006.01)
*H01R 43/20* (2006.01)
*H01R 43/24* (2006.01)
*H02K 1/12* (2006.01)

(52) U.S. Cl.
CPC ..... *H02K 15/0056* (2013.01); *H02K 15/0068* (2013.01); *H02K 15/02* (2013.01); *B33Y 10/00* (2014.12); *B33Y 40/00* (2014.12); *B33Y 80/00* (2014.12); *H01R 43/16* (2013.01); *H01R 43/20* (2013.01); *H01R 43/24* (2013.01); *H02K 1/12* (2013.01); *H02K 1/18* (2013.01); *H02K 1/187* (2013.01); *H02K 2203/09* (2013.01); *H02K 2203/12* (2013.01)

(58) Field of Classification Search
CPC ...... H02K 2203/12; H02K 1/18; H02K 1/187; H02K 15/0062; H02K 1/12; B33Y 10/00; B33Y 40/00; B33Y 80/00; H01R 43/16; H01R 43/20; H01R 43/24; B22F 7/08; B22F 10/28; B29C 64/112

See application file for complete search history.

(56) References Cited

U.S. PATENT DOCUMENTS

| | | |
|---|---|---|
| 2014/0268604 A1 | 9/2014 | Wicker et al. |
| 2015/0381002 A1* | 12/2015 | Hashimoto ........ H02K 15/0056 310/71 |
| 2016/0241093 A1* | 8/2016 | Patel ................. H02K 2203/12 |
| 2017/0250585 A1* | 8/2017 | Ohashi ............... H02K 15/0068 |
| 2017/0274974 A1* | 9/2017 | Hegenbart ............. B33Y 80/00 |
| 2018/0043618 A1 | 2/2018 | Shemelya et al. |
| 2018/0050486 A1 | 2/2018 | Talgorn et al. |

OTHER PUBLICATIONS

Kraemer et al, "Influences of separation and joining processes on single tooth laminated stacks," 2016 6th International Electric Drives Production Conference (EDPC), Nuremberg, Germany, 2016, pp. 178-185. (Year: 2016).*

* cited by examiner

HYBRID ADDITIVE MANUFACTURING ASSISTED PROTOTYPING FOR MAKING ELECTRO-MECHANICAL COMPONENTS

INTRODUCTION

The present disclosure relates a method for hybrid additive manufacturing assisted prototyping.

Some auto parts (e.g., motor connection rings) are made of electrically conductive materials (e.g., copper) with electric molding (e.g., polymer). The investment of a single iteration prototype is very expensive in both time (e.g., a few months) and money (about $100,000). It is therefore desirable to develop a method for hybrid additive manufacturing assisted prototyping to produce a complete multi-material prototyping part in a quick and inexpensive manner.

SUMMARY

Many auto parts (e.g. motor connection rings) are made of conducting metals (e.g., copper) with dielectric molding (e.g., polymer). The investment of a single-iteration prototype is very expensive in both time (a few months) and money. The presently disclosed method is a hybrid-additive-manufacturing-assisted approach to produce a complete multi-material prototyping part both quickly and inexpensively. This method eliminates the investment (both time and money) for prototyping in physical testing stage. The presently disclosed method uses hybrid additive manufacturing processes (e.g., for metal and dielectric materials) to produce a complete part for physical testing. The polymeric part may be used as a supporting ring with channels to facilitate assembly with the metal pieces. The plastic parts may be formed into two or more pieces for mechanical assembly using elastic average couplings.

The present disclosure describes a method for making electro-mechanical components, such as a connection support for a stator assembly, using hybrid additive manufacturing. In some embodiments, the method includes creating a plurality of substrates using an additive manufacturing process. Each of the substrates includes a polymeric material. The substrates include a first substrate and a second substrate. The first substrate includes a first main body and defines a protrusion extending from the first main body. The second substrate includes a second main body and defines a recess defined in the second main body. The method further includes coupling the first substrate to the second substrate by inserting the protrusion into the recess such that the protrusion elastically deforms to an elastically averaged configuration to facilitate alignment and coupling of the first substrate to the second substrate. The protrusion and the recess together form an elastic averaging coupling. The method further includes coupling a plurality of electrically conductive components to at least one of the plurality of substrates.

The additive manufacturing process may be referred to as a first additive manufacturing process. The method may further include creating the plurality of electrically conductive components using a second additive manufacturing process. The first additive manufacturing process may be different from the second additive manufacturing process. The second additive manufacturing process may be electron-beam melting. The first additive manufacturing process may be material jetting 3D printing.

The electrically conductive components may be leads and at least one neutral bus bars of a stator assembly. The substrates collectively form a connection support for a stator assembly, wherein the connection support is wholly made of the polymeric material and is configured to support the electrically conductive components. The method may further include welding two or more of the electrically conductive components to the stator core after coupling the plurality of electrically conductive components to at least one of the plurality of substrates.

The substrates may be the first substrate, the second substrate, a third substrate, and a fourth substrate. Each of the first substrate, the second substrate, the third substrate, and the fourth substrate may be wholly made of the polymeric material. In the disclosed method, creating the plurality of substrates using the additive manufacturing process may include: creating the first substrate using material jetting 3D printing; creating the second substrate using material jetting 3D printing after creating the first substrate; and creating the third substrate using material jetting 3D printing after creating the second substrate.

The protrusion may be referred to as a first protrusion. The first protrusion is elastically deformable. The recess may be referred to as a second recess of the second substrate. The second recess is elastically deformable. The elastic averaging coupling may be referred to as a first elastic averaging coupling. The recess may be sized to receive the first protrusion such that the first protrusion elastically deforms to an elastically averaged configuration to facilitate alignment and coupling of the first substrate to the second substrate, wherein the first protrusion and the recess together form the first elastic averaging coupling. The second substrate may include a second protrusion extending directly from the second main body. The second protrusion is elastically deformable. The third substrate defines a third recess in the third main body. The third substrate may include a third main body and a third protrusion extending directly from the third main body. The third recess is elastically deformable. The method further includes coupling the second substrate to the third substrate by inserting the second protrusion into the third recess such that the second protrusion elastically deforms to the elastically averaged configuration to facilitate alignment and coupling of the second substrate to the third substrate. The second protrusion and the third recess together form a second elastic averaging coupling. The third protrusion is elastically deformable. The fourth substrate may include a fourth recess. The fourth recess is elastically deformable.

The method may further include coupling the third substrate to the fourth substrate by inserting the third protrusion into the fourth recess such that the third protrusion elastically deforms to the elastically averaged configuration to facilitate alignment and coupling of the third substrate to the fourth substrate. The third protrusion and the fourth recess together forming a third elastic averaging coupling after coupling the second substrate to the third substrate. The first substrate, the second substrate, the third substrate, and the fourth substrate collectively have an arc shape when the first substrate is coupled to the second substrate, the second substrate is coupled to the third substrate. The third substrate is coupled to the fourth substrate to facilitate alignment with the stator core.

The electrically conductive components may include a first lead, a second lead, and a third lead. Each of the first lead, the second lead, and the third lead may be wholly made of a metallic material. The first substrate defines a first aperture sized to receive the first lead. The method may further include coupling the plurality of electrically conductive components to at least one of the plurality of substrates, which includes sliding the first lead into the first aperture to couple the first lead to the first substrate. The second substrate defines a second aperture sized to receive the second lead. The method may further include coupling the plurality of electrically conductive components to at least one of the plurality of substrates includes sliding the second lead into the second aperture to couple the second lead to the second substrate after sliding the first lead into the first aperture. The third substrate defines a third aperture sized to receive the third lead. The method may further include coupling the plurality of electrically conductive components to at least one of the plurality of substrates includes sliding the third lead into the third aperture to couple the third lead to the third substrate after sliding the second lead into the second aperture.

Creating the plurality of electrically conductive components using a second additive manufacturing process may include: creating the first lead using electron-beam melting; creating the second lead using electron-beam melting after creating the first lead; and creating the third lead using electron-beam melting after creating the second lead. Creating the plurality of electrically conductive components using a second additive manufacturing process may include creating at least one neutral bus bar using electron-beam melting. The neutral bus bar may be wholly made of the metallic material. The neutral bus bar may include main bar body. The main bar body has an arc shape to facilitate coupling with the first substrate, the second substrate, the third substrate, and the fourth substrate. The neutral bus bar may further include a first bar lead, a second bar lead, and a third bar lead each extending directly from the main bar body. The second substrate defines a fourth aperture sized to receive the first bar lead. The third substrate defines a fifth aperture sized to receive the second bar lead. The fourth substrate defines a sixth aperture sized to receive the third bar lead. Coupling the plurality of electrically conductive components to at least one of the plurality of substrates may include: placing the first bar lead in the fourth aperture of the second substrate; placing the second bar lead in the fifth aperture of the third substrate; and placing the third bar lead in the sixth aperture of the fourth substrate. The method disclosed above may be used to create a connection support for a stator assembly as described above.

The present disclosure also relates to a connection support for a stator assembly. In some aspects of the present disclosure, the connection support includes a plurality of substrates each including a polymeric material. The plurality of substrates includes a first substrate including a first main body and a protrusion extending from the first main body. The protrusion is elastically deformable. The plurality of substrates also includes a second substrate including a second main body. The second substrate defines a recess in the second main body. The recess is elastically deformable. The protrusion is disposed inside the recess to form an elastic averaging coupling. The connection support further includes a plurality of electrically conductive components coupled to the plurality of substrates.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description.

Figure 1:
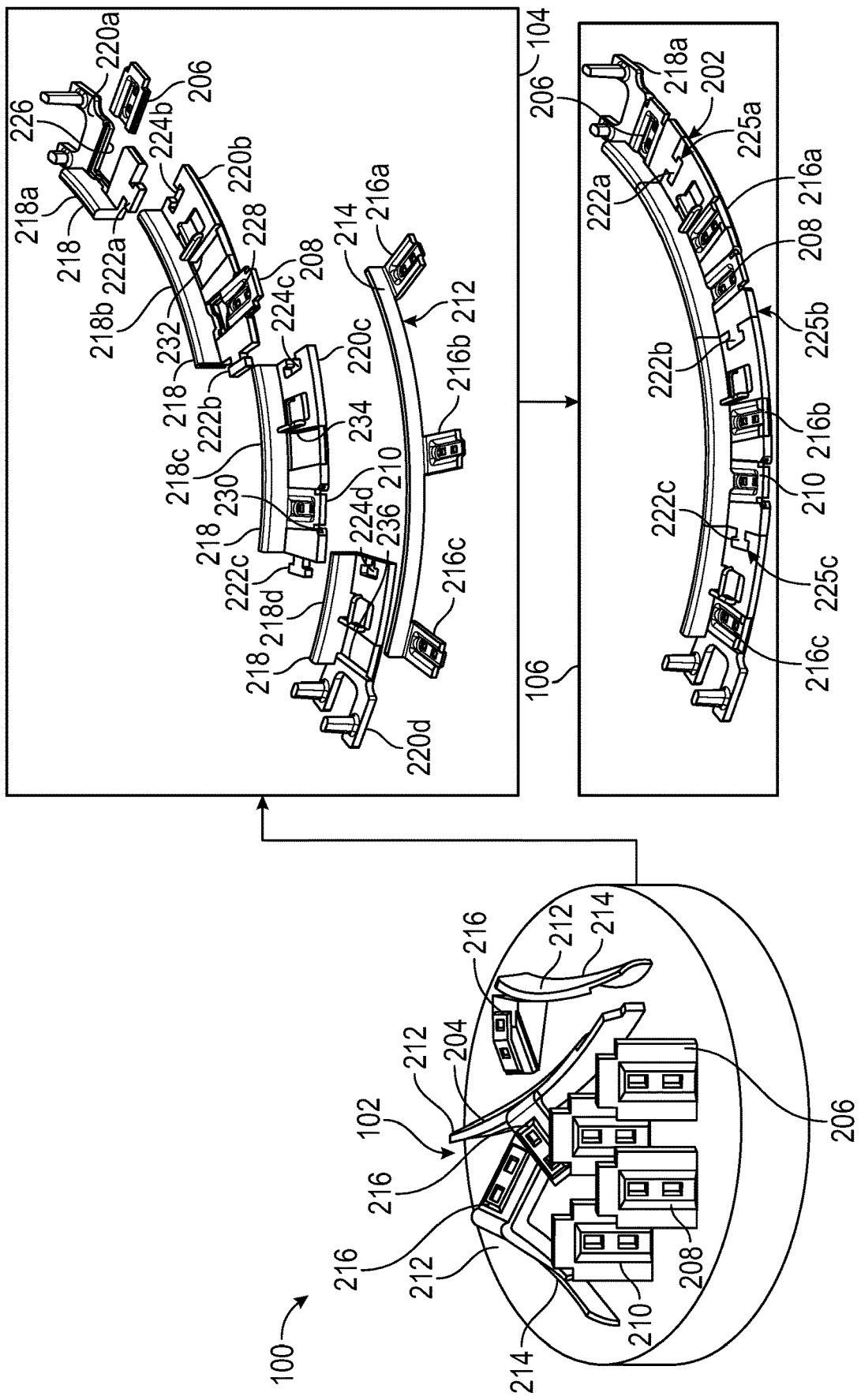
FIG. 1 is a flowchart of a method for hybrid additive manufacturing assisted prototyping.

FIG. 1 illustrates a method 100 for hybrid additive manufacturing assisted prototyping. The method 100 may be used to create prototypes of electromechanical components, such as a stator assembly 200 (FIG. 2), a connection support 202 for the stator assembly 200 of an electric motor, among others. In some embodiments, the method 100 begins at block 102. At block 102, the electrically conductive components 204 are made using an additive manufacturing process to minimize the time it takes to create prototypes of the electrically conductive components 204, while minimizing costs. In the present disclosure, the term "additive manufacturing process" means manufacturing process through which three-dimensional (3D) solid objects are created, wherein the manufacturing process enables the creation of physical 3D models of objects using a series of additive or layered development framework, and the layers are laid down in succession to create a complete 3D object. The electrically conductive components 204 are partly or wholly made of a metallic material to conduct electricity. In block 102, the additive manufacturing process may be a process suitable to 3D print metals. For example, electron-beam melting (EBM) may be the additive manufacturing process used to create the electrically conductive components 204, thereby allowing the use of high-purity and high-density metals to form electrically conductive components 204. In the present disclosure, the term "electron-beam melting" means an additive manufacturing process in which the raw material (e.g., metal powder or wire) is placed under a vacuum and fused together from heating by an electron beam. The electrically conductive components 204 may include one or more phase leads for the stator assembly 200, such as a first lead 206, a second lead 208, and a third lead 210. Thus, block 102 entails creating the first lead 206, the second lead 208, and the third lead 210 using an additive manufacturing process, such as EBM. In other words, block 104 may entail: creating the first lead 206 using electron-beam melting; creating the second lead 208 using electron-beam melting after creating the first lead 206; and creating the third lead 210 using electron-beam melting after creating the second lead 208.

In some embodiments, each of the first lead 206, the second lead 208, and the third lead 210 is wholly made of a metallic material to facilitate conduction of electricity. The electrically conductive components 204 may further include one or more neutral bus bar 212. The neutral bus bar 212 may be wholly made of a metallic material to facilitate conduction of electricity. The neutral bus bar 212 includes a main bar body 214 and one or more bar leads 216, such as a first bar lead 216a, a second bar lead 216b, and a third bar lead 216c. Each of the first bar lead 216a, the second bar lead 216b, and the third bar lead 216c extends directly from the main bar body 214 to enhance the structural integrity of the neutral bus bar 212. The main bar body 214 of the neutral bus bar 212 has an arc shape to follow the curvature of a stator core 201 of the stator assembly 200, thereby minimizing the space occupied by the stator assembly 200. Thus, block 102 entails creating the at least one neutral bus bar 212 using electron-beam melting or another suitable additive manufacturing process. While the neutral bus bar 212 is a one-piece structure, block 102 may entail creating several sections of the neutral bus bar 212 using electron-beam melting or another suitable additive manufacturing process and then welding the sections together.

The method 100 also includes block 104, which may occur after or before block 102. Block 104 entails creating a plurality of substrates 208 using an additive manufacturing process to minimize the time it takes to create prototypes of the substrates 208, while minimizing costs. Each of the substrates 218 may be wholly of a polymeric material to insulate the flow of electric current through the substrates 218. The substrates 218 collectively form the connection support 202. The connection support 202 is configured to support the electrically conductive components 204 and is configured as a semi-circular plate to follow the curvature of a stator core 201 of the stator assembly 200, thereby minimizing the space occupied by the stator assembly 200. The additive manufacturing process used in block 104 is different from the additive manufacturing process used in block 102, because different additive manufacturing processes are used to create metal and polymers parts. For example, in block 104, material jetting 3D printing may be used to create the substrates 208 in order to produce accurate multi-material and multi-color prints that represent end products. In the present disclosure, the term "material jetting 3D printing" means an additive manufacturing process in which parts are built using photosensitive polymeric powders, which are cured (made solid) with ultraviolet (UV) light.

In various embodiments, the substrates 218 may include the first substrate 218a, the second substrate 218b, a third substrate 218c, and a fourth substrate 218d. Each of the first substrate 218a, the second substrate 218b, the third substrate 218c, and the fourth substrate 218c may be wholly made of the polymeric material to minimize the flow of electric current through the substrates 218. Block 104 may include: creating the first substrate 218a using material jetting 3D printing; creating the second substrate 218b using material jetting 3D printing after creating the first substrate 218; and creating the third substrate 218c using material jetting 3D printing after creating the second substrate 218b. The first substrate 218a includes a first main body 220a and defines a first protrusion 222a extending directly from the first main body 220a to enhance the structural integrity of the first substrate 218a. The second substrate 218b includes a second main body 220b and defines a recess (identified as second recess 224b) defined in the second main body 220b. The second recess 224b is sized to receive the first protrusion 222a as discussed below. The second substrate 218b further includes a second protrusion 222b extending directly from the second main body 220b to enhance the structural integrity of the second substrate 218b. The third substrate 218c includes a third main body 220c and a third protrusion 222c extending directly from the third main body 220c to enhance the structural integrity of the third substrate 218c. The third substrate 218c defines a recess (identified as third recess 224c) defined in the third main body 220c. The third recess 224c is sized to receive the second protrusion 222b as discussed below. The fourth substrate 218d includes a fourth main body 220d and defines a recess (identified as fourth recess 224d) defined in the fourth main body 220d. The fourth recess 224d is sized to receive the third protrusion 222c as discussed below.

The first substrate 218a defines a first aperture 226 sized to receive the first lead 206. The second substrate 218b define a second aperture 228. The second substrate 218b defines a second aperture 228 sized to receive the second lead 208. The third substrate 218c defines a third aperture 230 sized to receive the third lead 210. The second substrate 218b defines a fourth aperture 232 sized to receive the first bar lead 216a. The third substrate 218c defines a fifth aperture 234 sized to receive the second bar lead 216b. The fourth substrate 218d defines a sixth aperture 236 sized to receive the third bar lead 216c.

After blocks 102 and/or 104, the method 100 proceeds to block 106. Block 106 entails coupling the first substrate 218a, the second substrate 218b, the third substrate 218c, and the third substrate 218d to one another to form the connection support 202. The first substrate 218a, the second substrate 218b, the third substrate 218c, and the fourth substrate 218c collectively have an arc shape when the first substrate 218a is coupled to the second substrate 218b, the second substrate 218b is coupled to the third substrate 218c, and the third substrate 218c is coupled to the fourth substrate 218d to facilitate alignment with the stator core 201. Block 106 includes coupling the first substrate 218a to the second substrate 218b by inserting the first protrusion 222a into the second recess 224b such that the first protrusion 222a elastically deforms to an elastically averaged configuration to facilitate alignment and coupling of the first substrate 218a to the second substrate 218b. The first protrusion 222a and the second recess 224b together form an elastic averaging coupling 225a.

In an elastic averaging coupling, a subset of surface coupling types where improved accuracy is derived from the averaging of error over a large number of contacting surfaces. As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging couplings provide elastic deformation of the interface(s) between mated components, wherein the average deformation provides a precise alignment, the manufacturing positional variance being minimized to $X_{min}$, defined by, $X_{min}=X\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit elastically deforms at least one of the at least one features or the mating feature, or both features. The resiliently reversible nature of these features of the components allows repeatable insertion and withdrawal of the components that facilitate their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The embodiments disclosed herein provide the ability to convert an existing component that is not compatible with the elastic averaging principles described herein to an assembly that does facilitate elastic averaging and the benefits associated therewith.

The first protrusion 222a and the second recess 224b are elastically deformable. As discussed above, the second recess 224b is sized to receive the first protrusion 222a such that the first protrusion 222a elastically deforms to an elastically averaged configuration to facilitate alignment and coupling of the first substrate 218a to the second substrate 224b. Accordingly, the first protrusion 222a and the second recess 224b together form the first elastic averaging coupling 225a.

The second protrusion 222a and the third recess 224c are elastically deformable. Block 106 further includes coupling the second substrate 218b to the third substrate 218c by inserting the second protrusion 222b into the third recess 224c, such that the second protrusion 222a elastically deforms to the elastically averaged configuration to facilitate alignment and coupling of the second substrate 218b to the third substrate 218c. The second protrusion 222b and the third recess 224c together forming a second elastic averaging coupling 225b.

The third protrusion 222c and the fourth recess 224d are elastically deformable. Block 106 further includes coupling the third substrate 218c to the fourth substrate 218d by inserting the third protrusion 222c into the fourth recess 224d. such that the third protrusion 222c elastically deforms to the elastically averaged configuration to facilitate alignment and coupling of the third substrate 218c to the fourth substrate 218d. The third protrusion 222c and the fourth recess 224d together forming a third elastic averaging coupling 225c. The first substrate 218a, the second substrate 218b, the third substrate 218c, and the fourth substrate 218d collectively have an arc shape when the first substrate 218a is coupled to the second substrate 218b, the second substrate 218b is coupled to the third substrate 218c, and the third substrate 218c is coupled to the fourth substrate 218d to facilitate alignment with the stator core 201.

Block 106 further includes coupling the electrically conductive components 204 to the substrates 218. For example, the first lead 206 is slid into the first aperture 226 to couple the first lead 206 to the first substrate 218a. The second lead 208 is slid into the second aperture 228 to couple the second lead 208 to the second substrate 218b after sliding the first lead 206 into the first aperture 226. The third lead 210 is slid into the third aperture 230 to couple the third lead 210 to the third substrate 218c after sliding the second lead 208 into the second aperture 228. To couple the neutral bus bar 216 to the substrates 218, the first bar lead 216s is placed in the fourth aperture 232 of the second substrate 218b, the second bar lead 216b is placed in the fifth aperture 234 of the third substrate 218c, and the third bar lead 216c is placed in the sixth aperture 236 of the fourth substrate 218d.

Figure 2:
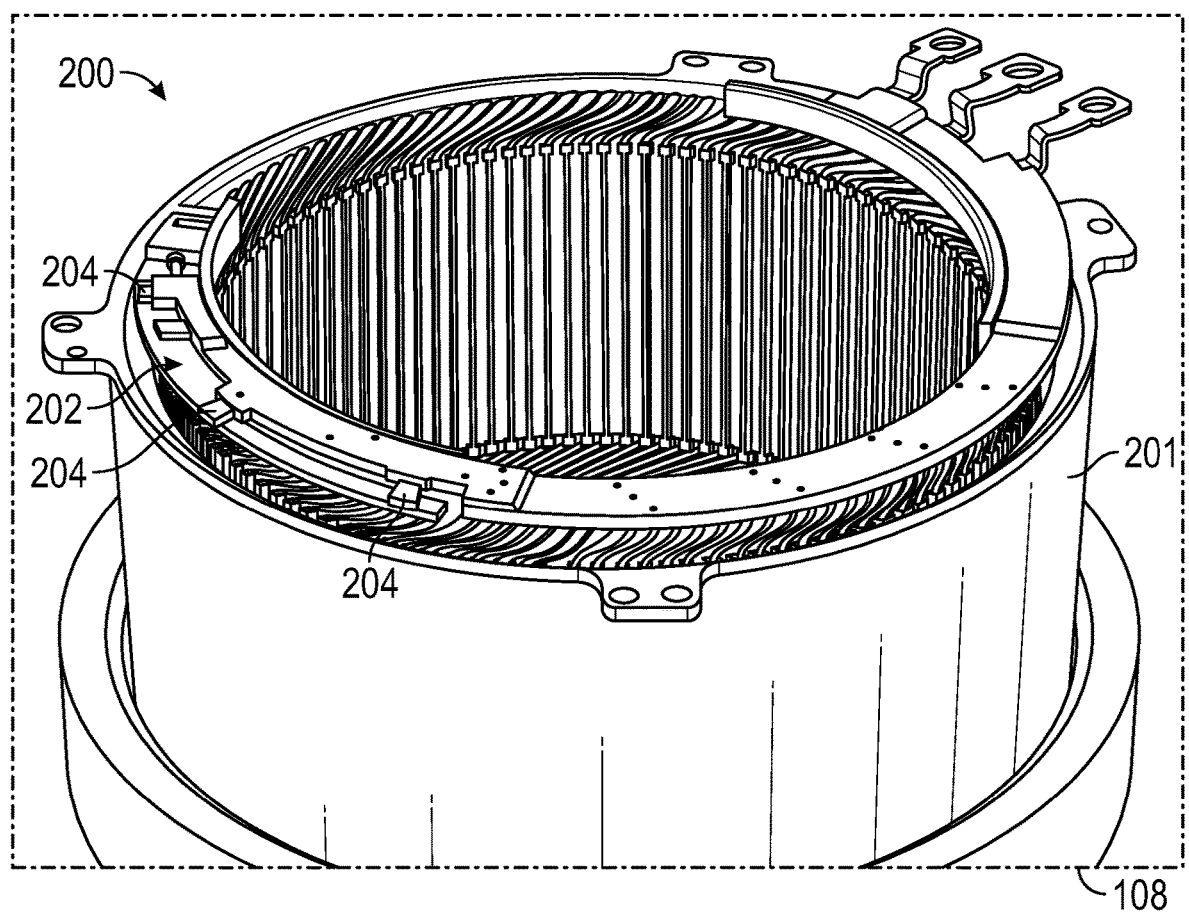
FIG. 2 is a schematic isometric view of a stator assembly including a connection support manufactured using the method of FIG. 1.

With reference to FIG. 2, the method 100 continues to block 108 after block 106. Block 108 entails welding at least two or more of the electrically conductive components 204 to the stator core 201 of the stator assembly 200 after coupling the electrically conductive components 204 to the substrates 218.

The detailed description and the drawings or figures are exemplary of the description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for creating a connection support for a stator assembly, comprising:
creating a plurality of substrates using an additive manufacturing process, wherein:
each of the plurality of substrates includes a polymeric material;
the plurality of substrates includes a first substrate and a second substrate;
the first substrate includes a first main body and defines a protrusion extending from the first main body; and
the second substrate includes a second main body and defines a recess defined in the second main body;
coupling the first substrate to the second substrate by inserting the protrusion into the recess such that the protrusion elastically deforms within the recess to an elastically averaged configuration to facilitate alignment and coupling of the first substrate to the second substrate, wherein the protrusion and the recess together form an elastic averaging coupling; and
coupling a plurality of electrically conductive components to at least one of the plurality of substrates;
wherein:
the additive manufacturing process is a first additive manufacturing process, and the method further includes creating the plurality of electrically conductive components using a second additive manufacturing process;
the first additive manufacturing process is different from the second additive manufacturing process;
the second additive manufacturing process is electron-beam melting;
the first additive manufacturing process is material jetting 3D printing;
the electrically conductive components are leads and at least one neutral bus bar of the stator assembly;
the substrates collectively form the connection support for the stator assembly; and
the connection support is wholly made of the polymeric material and is configured to support the electrically conductive components;
welding at least two of the electrically conductive components to a stator core of the stator assembly after coupling the plurality of electrically conductive components to the at least one of the plurality of substrates.

2. The method of claim 1, wherein:
the plurality of substrates includes the first substrate, the second substrate, a third substrate, and a fourth substrate;
each of the first substrate, the second substrate, the third substrate, and the fourth substrate is wholly made of the polymeric material;
creating the plurality of substrates using the additive manufacturing process includes:
creating the first substrate using the material jetting 3D printing;
creating the second substrate using the material jetting 3D printing after creating the first substrate; and
creating the third substrate using the material jetting 3D printing after creating the second substrate.

3. The method of claim 2, wherein:
the protrusion is a first protrusion;
the first protrusion is elastically deformable;
the recess is a second recess of the second substrate;

the second recess is elastically deformable;
the elastic averaging coupling is a first elastic averaging coupling;
the second recess is sized to receive the first protrusion such that the first protrusion elastically deforms to an elastically averaged configuration to facilitate alignment and coupling of the first substrate to the second substrate, wherein the first protrusion and the second recess together form the first elastic averaging coupling;
the second substrate includes a second protrusion extending directly from the second main body;
the second protrusion is elastically deformable;
the third substrate includes a third main body and a third protrusion extending directly from the third main body;
the third substrate defines a third recess in the third main body;
the third recess is elastically deformable;
the method further includes coupling the second substrate to the third substrate by inserting the second protrusion into the third recess such that the second protrusion elastically deforms to the elastically averaged configuration to facilitate alignment and coupling of the second substrate to the third substrate, the second protrusion and the third recess together forming a second elastic averaging coupling;
the third protrusion is elastically deformable;
the fourth substrate includes a fourth recess;
the fourth recess is elastically deformable;
the method further includes coupling the third substrate to the fourth substrate by inserting the third protrusion into the fourth recess such that the third protrusion elastically deforms to the elastically averaged configuration to facilitate alignment and coupling of the third substrate to the fourth substrate, the third protrusion and the fourth recess together forming a third elastic averaging coupling after coupling the second substrate to the third substrate; and
the first substrate, the second substrate, the third substrate, and the fourth substrate collectively have an arc shape when the first substrate is coupled to the second substrate, the second substrate is coupled to the third substrate, and the third substrate is coupled to the fourth substrate to facilitate alignment with the stator core.

4. The method of claim 3, wherein:
the plurality of electrically conductive components includes a first lead, a second lead, and a third lead;
each of the first lead, the second lead, and the third lead is wholly made of a metallic material;
the first substrate defines a first aperture sized to receive the first lead;
coupling the plurality of electrically conductive components to the at least one of the plurality of substrates includes sliding the first lead into the first aperture to couple the first lead to the first substrate;
the second substrate defines a second aperture sized to receive the second lead;
coupling the plurality of electrically conductive components to the at least one of the plurality of substrates includes sliding the second lead into the second aperture to couple the second lead to the second substrate after sliding the first lead into the first aperture;
the third substrate defines a third aperture sized to receive the third lead; and
coupling the plurality of electrically conductive components to the at least one of the plurality of substrates includes sliding the third lead into the third aperture to couple the third lead to the third substrate after sliding the second lead into the second aperture.

5. The method of claim 4, wherein creating the plurality of electrically conductive components using the second additive manufacturing process includes:
creating the first lead using the electron-beam melting;
creating the second lead using the electron-beam melting after creating the first lead; and
creating the third lead using the electron-beam melting after creating the second lead.

6. The method of claim 5, wherein creating the plurality of electrically conductive components using the second additive manufacturing process includes:
creating the at least one neutral bus bar using the electron-beam melting;
the at least one neutral bus bar is wholly made of the metallic material;
the at least one neutral bus bar includes main bar body;
the main bar body has an arc shape to facilitate coupling with the first substrate, the second substrate, the third substrate, and the fourth substrate;
the least one neutral bus bar further includes a first bar lead, a second bar lead, and a third bar lead each extending directly from the main bar body;
the second substrate defines a fourth aperture sized to receive the first bar lead;
the third substrate defines a fifth aperture sized to receive the second bar lead;
the fourth substrate defines a sixth aperture sized to receive the third bar lead;
coupling the plurality of electrically conductive components to the at least one of the plurality of substrates includes:
placing the first bar lead in the fourth aperture of the second substrate;
placing the second bar lead in the fifth aperture of the third substrate; and
placing the third bar lead in the sixth aperture of the fourth substrate.

7. A method for creating a connection support for a stator assembly, comprising:
creating a plurality of substrates of the connection support using material jetting 3D printing of a first additive manufacturing process, wherein:
each of the plurality of substrates includes a polymeric material;
the plurality of substrates includes a first substrate and a second substrate;
the first substrate includes a first main body and defines a protrusion extending from the first main body; and
the second substrate includes a second main body and defines a recess defined in the second main body;
coupling the first substrate to the second substrate by inserting the protrusion into the recess such that the protrusion elastically deforms within the recess to an elastically averaged configuration to facilitate alignment and coupling of the first substrate to the second substrate, wherein the protrusion and the recess together form an elastic averaging coupling;
creating a plurality of electrically conductive components using electron-beam melting of a second additive manufacturing process after creating the plurality of substrates; and
coupling the plurality of electrically conductive components to the plurality of substrates;

wherein:
the first additive manufacturing process is different from the second additive manufacturing process;
the electrically conductive components are leads and at least one neutral bus bar of the stator assembly;
the substrates collectively form the connection support for the stator assembly; and
the connection support is wholly made of the polymeric material and is configured to support the electrically conductive components;
welding at least two of the electrically conductive components to a stator core of the stator assembly after coupling the plurality of electrically conductive components to the at least one of the plurality of substrates.

8. The method of claim 7, wherein:
the plurality of substrates includes the first substrate, the second substrate, a third substrate, and a fourth substrate;
each of the first substrate, the second substrate, the third substrate, and the fourth substrate is wholly made of the polymeric material;
creating the plurality of substrates using the first additive manufacturing process includes:
creating the first substrate using the material jetting 3D printing;
creating the second substrate using the material jetting 3D printing after creating the first substrate; and
creating the third substrate using the material jetting 3D printing after creating the third substrate.

9. The method of claim 8, wherein:
the protrusion is a first protrusion;
the recess is a second recess of the second substrate;
the elastic averaging coupling is a first elastic averaging coupling;
the second recess is sized to receive the first protrusion such that the first protrusion elastically deforms to an elastically averaged configuration to facilitate alignment and coupling of the first substrate to the second substrate, wherein the first protrusion and the second recess together form the first elastic averaging coupling;
the second substrate includes a second protrusion extending directly from the second main body;
the third substrate includes a third main body and a third protrusion extending directly from the third main body;
the third substrate defines a third recess in the third main body;
the method further includes coupling the second substrate to the third substrate by inserting the second protrusion into the third recess such that the second protrusion elastically deforms to the elastically averaged configuration to facilitate alignment and coupling of the second substrate to the third substrate, the second protrusion and the third recess together forming a second elastic averaging coupling;
the fourth substrate includes a fourth recess;
the method further includes coupling the third substrate to the fourth substrate by inserting the third protrusion into the fourth recess such that the third protrusion elastically deforms to the elastically averaged configuration to facilitate alignment and coupling of the third substrate to the fourth substrate, the third protrusion and the fourth recess together forming a third elastic averaging coupling after coupling the second substrate to the third substrate, the third protrusion and the fourth recess together forming the third elastic averaging coupling; and
the first substrate, the second substrate, the third substrate, and the fourth substrate collectively have an arc shape when the first substrate is coupled to the second substrate, the second substrate is coupled to the third substrate, and the third substrate is coupled to the fourth substrate to facilitate alignment with the stator core.

10. The method of claim 9, wherein:
the plurality of electrically conductive components includes a first lead, a second lead, and a third lead;
each of the first lead, the second lead, and the third lead is wholly made of a metallic material;
the first substrate defines a first aperture sized to receive the first lead;
coupling the plurality of electrically conductive components to the at least one of the plurality of substrates includes sliding the first lead into the first aperture to couple the first lead to the first substrate;
the second substrate defines a second aperture sized to receive the second lead;
coupling the plurality of electrically conductive components to the at least one of the plurality of substrates includes sliding the second lead into the second aperture to couple the second lead to the second substrate after sliding the first lead into the first aperture;
the third substrate defines a third aperture sized to receive the third lead; and
coupling the plurality of electrically conductive components to the at least one of the plurality of substrates includes sliding the third lead into the third aperture to couple the third lead to the third substrate after sliding the second lead into the second aperture.

* * * * *